United States Patent [19]
Blum

[11] Patent Number: 5,944,779
[45] Date of Patent: *Aug. 31, 1999

[54] CLUSTER OF WORKSTATIONS FOR SOLVING COMPUTE-INTENSIVE APPLICATIONS BY EXCHANGING INTERIM COMPUTATION RESULTS USING A TWO PHASE COMMUNICATION PROTOCOL

[75] Inventor: Edward K. Blum, Los Angeles, Calif.

[73] Assignee: Compbionics, Inc., Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/675,394

[22] Filed: Jul. 2, 1996

[51] Int. Cl.$^6$ ............................ G06F 15/163; G06F 15/00
[52] U.S. Cl. .............................. 709/201; 709/232; 712/29
[58] Field of Search ............................... 395/672, 200.62, 395/800.28, 800.29, 800.3, 800.31, 200.79, 306, 307, 308, 309, 310, 311, 312, 800.16, 800.17, 800.18, 800.19, 800.2, 800.21, 800.22, 200.31

[56] References Cited

U.S. PATENT DOCUMENTS

| | | | |
|---|---|---|---|
| 4,739,476 | 4/1988 | Fiduccia | 395/800.22 |
| 5,025,369 | 6/1991 | Schwartz | 395/672 |
| 5,495,618 | 2/1996 | Cok | 395/800.16 |
| 5,784,591 | 7/1998 | Kageshima | 395/500 |
| 5,862,340 | 1/1999 | Reynolds | 395/200.58 |

OTHER PUBLICATIONS

Noble, B., et al., "Performance of Synchronous Parallel Discrete–Event Simulation," Proc. of the 285h Annual Hawaii Int'l. Conf. on System Sciences, IEEE, pp. 185–186, Jan. 1995.

Soliman, H., et al., "Parallel and Distributed Simulation: An Overview," Proc. of the 1995 Symp. on Computers and Communications, IEEE, pp. 270–276, Apr. 1995.

Plank, J., et al., "Algorithm–Based Diskless Checkpointing for Fault Tolerant Matrix Operations," Proc. of the 1995 Int'l. Symp. on Fault–Tolerant Computing, IEEE351–60, 1995.

Sienicki, J., et al., "An Adaptive Distributed Algorithm for Sequential Circuit Test Generation," Proc. of the 1995 European Design Automation Conf., IEEE, pp. 236–241, Apr. 1995.

Skjellum, A., et al., "Extending the Message Passing Interface (MPI)," Proc. of the 1994 Conf. on Scalable Parallel Libraries, IEEE, pp. 106–118, 1995.

(List continued on next page.)

*Primary Examiner*—Zarni Maung
*Assistant Examiner*—Andrew Caldwell
*Attorney, Agent, or Firm*—Crosby, Heafy, Roach & May

[57] ABSTRACT

A system and method for connecting computer workstations in clusters to perform parallel-distributed processing with respect to compute-intensive applications are provided. Commodity computers/workstations and commodity network hardware are arranged to form unique-architecture building blocks (clusters) which may then act as supernodes in larger scale cluster systems. An integrated ROCC+ (Reduced Overhead Cluster Communication) message passing software system provides unique communication logic for efficient implementation of collective message passing operations between each node and supernode. According to a preferred embodiment, each building block comprises two ethernet segments and four nodes (e.g., workstations), two of which are connected by Network Interface Cards (NICs) to both segments with the remaining nodes each connected to a respective one of the segments. The ROCC+ software establishes communication links within and between the basic building blocks so as to eliminate collisions (contention) on segments while allowing for parallel (concurrent) message passing between nodes and supernodes.

25 Claims, 5 Drawing Sheets

Microfiche Appendix Included
(1 Microfiche, 33 Pages)

OTHER PUBLICATIONS

Chiola, G., et al., "Operating System Support for Fast Communications in a Network of Workstations," DISI-TR-96-12, Universita di Genova, pp. 1-16, Apr. 1996.

Stellner, G., "CoCheck: Checkpointing and Process Migration for MPI," Proc. of IPPS '96, IEEE, pp. 526-531, Apr. 1996.

Frost, R., "MPICH Performance Characteristics and Considerations," Proc. of the 2nd MPI Developer's Conf., IEEE, pp. 199-202, Jul. 1996.

Anglano, C., "Performance Modeling of Heterogeneous Distributed Applications," MASCOTS '96, IEEE, pp. 64-68, Feb. 1996.

Xu, Zhichen, "Simulation of Heterogeneous Networks of Workstations," Proc. of MASCOTS '96, IEEE, pp. 59-63, Feb. 1996.

Parashar, M., et al., "A Requirement Analysis for High Performance Distributed Computing Over LAN's," High Performance Distributed Computing, 1992 1st Int'l Symp., IEEE, pp. 142-151, Mar. 1992.

Ganz, A., et al., "Reconfiguration Algorithm for Ring Networks," Proc. of the 31st Conf. on Decision and Control, IEEE, pp. 3221-3226, Dec. 1992.

Walker, D., "The Design of a Standard Message Passing Interface for Distributed Memory Concurrent Computers," Parallel Computing, vol. 20, No. 4, pp. 657-673, Apr. 1994.

Lin, Mengjou, et al., "Virtual Permanent Connection: Network Computing Over Switch-Based High-Speed Networks," Proc. 1994 Int'l. Conf. on Parallel abd Distributed Systems, IEEE, pp. 628-633, Jun. 1994.

Hui, Chi-Chung et al., Solving Partial Differential Equations on a Network of Workstations, Proc. of the 3rd Int'l. Symposium on High Performance Distributed Computing, IEEE, pp. 194-201, Feb. 1994.

Anderson, T., et al., "A Case for NOW (Networks of Workstations)," IEEE Micro, vol. 15, No. 1, pp. 55-64, Feb. 1995.

Sterling, T., et al., "Communication Overhead for Space Science Applications on the Beowulf Parallel Workstation," Proc. of the 4th IEEE Int'l. Symposium on High Performance Distributed Computing, pp. 23-30, Aug. 1995.

Sterling, T., et al., "Beowulf: A Parallel Workstation for Scientific Computation," Proc. of the 1995 Int'l. Conf. on Parallel Processing, pp. 11-14, Aug. 1995.

Sterling, T., et al., "Achieving a Balanced Low-Cost Architecture for Mass Storage Management through Multiple Fast Ethernet Channels on the Beowulf Parallel Workstation," Proc. of the IPPS '96, IEEE, pp. 104-108, Apr. 1996.-

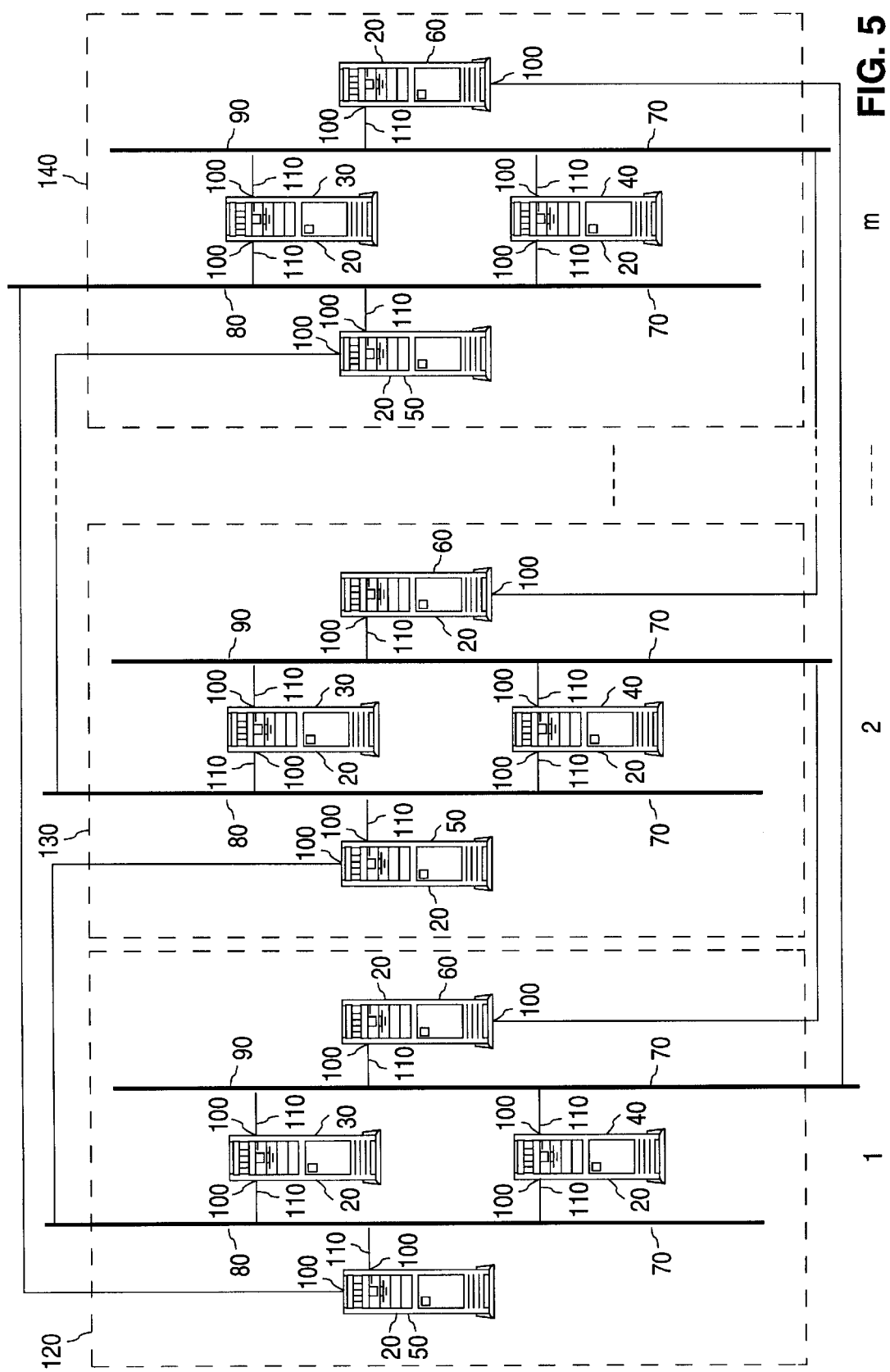

5,944,779

CLUSTER OF WORKSTATIONS FOR SOLVING COMPUTE-INTENSIVE APPLICATIONS BY EXCHANGING INTERIM COMPUTATION RESULTS USING A TWO PHASE COMMUNICATION PROTOCOL

MICROFICHE APPENDIX

This application includes one Microfiche Appendix comprising thirty-three frames.

COPYRIGHT NOTICE/AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The field of the present invention relates to computer networks. More particularly, it relates to a system and method for connecting computer workstations in clusters to perform parallel-distributed processing with respect to compute-intensive applications.

BACKGROUND OF THE INVENTION

Computer networks, e.g., local area (LAN's), wide area (WAN's), and others, abound and are increasing in number and variety. However, most installations are designed and used mainly for client-server applications, i.e., wherein multiple computers/workstations (clients) share the resources (e.g., application programs, data files, etc.) of the server, but otherwise operate independently. In such installations, various software systems provide the necessary message passing functions that allow the client stations and the server station of a network to communicate with each other.

Quite recently, a few networks have been organized into clusters of nodes that cooperate with each other so as to execute a single application problem in a parallel-distributed mode with no client-server relation between nodes. Many computing platforms have been designed to perform parallel-distributed computation. The essential idea is to distribute parts of an application problem to a group of processor elements and to organize these individual processors to run in parallel, independently, except at certain synchronization points where they must communicate their partial results to each other before continuing their computation tasks. As well, various schemes for doing the communication have been proposed. Some so-called supercomputers work this way, using special processor elements connected by special network hardware. However, with the advent of computer networking hardware-software systems, an alternative to the traditional supercomputer is available by using commodity computers (e.g. personal computers with standard operating systems) and commodity network hardware to connect the computers is in clusters. Cluster networks of simple design have been tested by the instant Applicant and others. Results indicate that, for many compute-intensive applications, clusters have the potential to provide a computing platform which greatly speeds up the execution of the application, and that it does so at comparatively moderate cost compared to present alternatives for use with such applications (e.g., supercomputers).

The simplest cluster network architecture consists of a single ethernet segment (e.g., a single cable or hub) and many network nodes (e.g., personal computers) connected to the segment through standard interface hardware. Communication is provided by a message-passing software system interfacing with standard message passing protocols (e.g. TCP/IP), and through them with software drivers for standard network interface cards (NICs). For many application problems, this simple architecture and the available message passing software system do not provide efficient speedup, resulting in high-cost or insufficient speedup, or both. Programming the mode of parallel-distributed execution noted above requires an efficient message-passing software system which provides a suite of commonly used message passing operations, such as node-to-node send and receive, and collective multi-node message passing operations, such as broadcast and all-gather (a standard repertoire of message passing operations for cluster programming is proposed in the document known as MPI (Message Passing Interface Forum. MPI: A Message Passing Interface Standard, Computer Science Department, Technical Report CS-94-230, University of Tennessee, Knoxville, Tenn. 1994) which is hereby incorporated by reference as though fully set forth herein. While several message passing software systems exist that do provide a suite of message passing operations which may be used in writing cluster application programs (e.g., ROCC95 software developed by the instant inventor, wherein "ROCC" stands for Reduced Overhead Cluster Communication), these software systems are based on standard, widely-used networking protocols (e.g., TCP/IP). Since some standard networking protocol is available in most computers/workstations as part of their operating system, these message passing software systems use this protocol layer as their interface with the network. Therefore, their design and implementation (i.e., algorithms and program code) are not part of any integrated hardware-software network system for cluster computing and, thus, are inefficient at best, if not inoperable, for most compute-intensive programming applications.

To obtain efficient speedup on a cluster, it must be possible for the application programmer to easily match his/her program to the cluster. Conversely, specific cluster hardware-software should match many applications to provide for economy of scale. As well, cluster design should allow the network architecture to be reconfigurable and scalable in size so as to match new and ever larger applications. Heretofore, such flexibility in design and application of cluster networks has not been realizable or practical.

The main hardware-software integration problem in designing a cluster's connectivity, i.e., network architecture, and a matching message passing software system, is how to reduce communication overhead to a point which allows sufficient and efficient (i.e., cost-effective) speedup of many applications by execution in a parallel mode. Since the parallel-mode involves both calculation on many nodes and communication of partial results between nodes, the reduction of communication overhead time relative to calculation time has been the subject of much research and development in the field of parallel computation. However, real cost-effective reduction of communication overhead has remained an open, unsolved problem—until now.

SUMMARY OF THE INVENTION

The present invention is an integrated hardware-software system and method for connecting computer workstations in clusters to perform parallel-distributed processing with respect to compute-intensive applications. In a preferred embodiment, the network of processors are uniquely configured in groups of four (each of which is designated herein as a "2×4net"); is computation processing is coordinated by unique message passing software (designated herein as "ROCC+"). According to the instant invention, the processors may cooperate on a single application problem so as to execute it in a parallel-distributed mode by passing messages to each other in order to communicate intermediate partial results as the computation proceeds. In accordance with this embodiment as well, multiple 2×4nets may be utilized as building blocks and interconnected so as to cooperate on application problems of larger scale and/or to reduce calculation times. In such manner, each 2×4net, which is itself a cluster, functions as a supernode which may be scaled up to form larger clusters which, in turn, comprise unique architectures.

The message passing software of the instant invention, ROCC+, includes most of the MPI repertoire of operations and implements them in unique ways to match the 2×4net cluster architectures so as to provide integrated cluster computing platforms for the efficient performance of a large class of parallel-distributed computations. The ROCC+ software system employs novel message passing algorithms to perform efficient message passing on the 2×4net clusters, both independently within each 2×4net supernode, and interdependently between 2×4net supernodes.

Accordingly, the present invention provides one or more of the following objects and advantages:

to provide a real, cost-effective solution to reducing communication overhead time relative to calculation time in cluster-based, parallel-distributed mode calculations;

to achieve cost economy of scale by utilizing commodity personal computers/workstations connected in a novel network configuration by means of commodity network hardware, as opposed to requiring dedicated, special-purpose processor chips or specially designed network hardware;

to provide an integrated software system in which an application programmer may easily match such program to the cluster system;

to provide a cluster design which is easily reconfigurable and scalable in size so as to match new and ever larger applications; and, to provide the above at a cost low enough to be within the range of affordability of many small organizations in the business, education and industrial communities.

Other objects and advantages of the present invention will become apparent from a review detailed description which follows, the accompanying drawings, and the appended claims.

DETAILED DESCRIPTION OF THE PREFERRED EMBODIMENT

Figure 1:
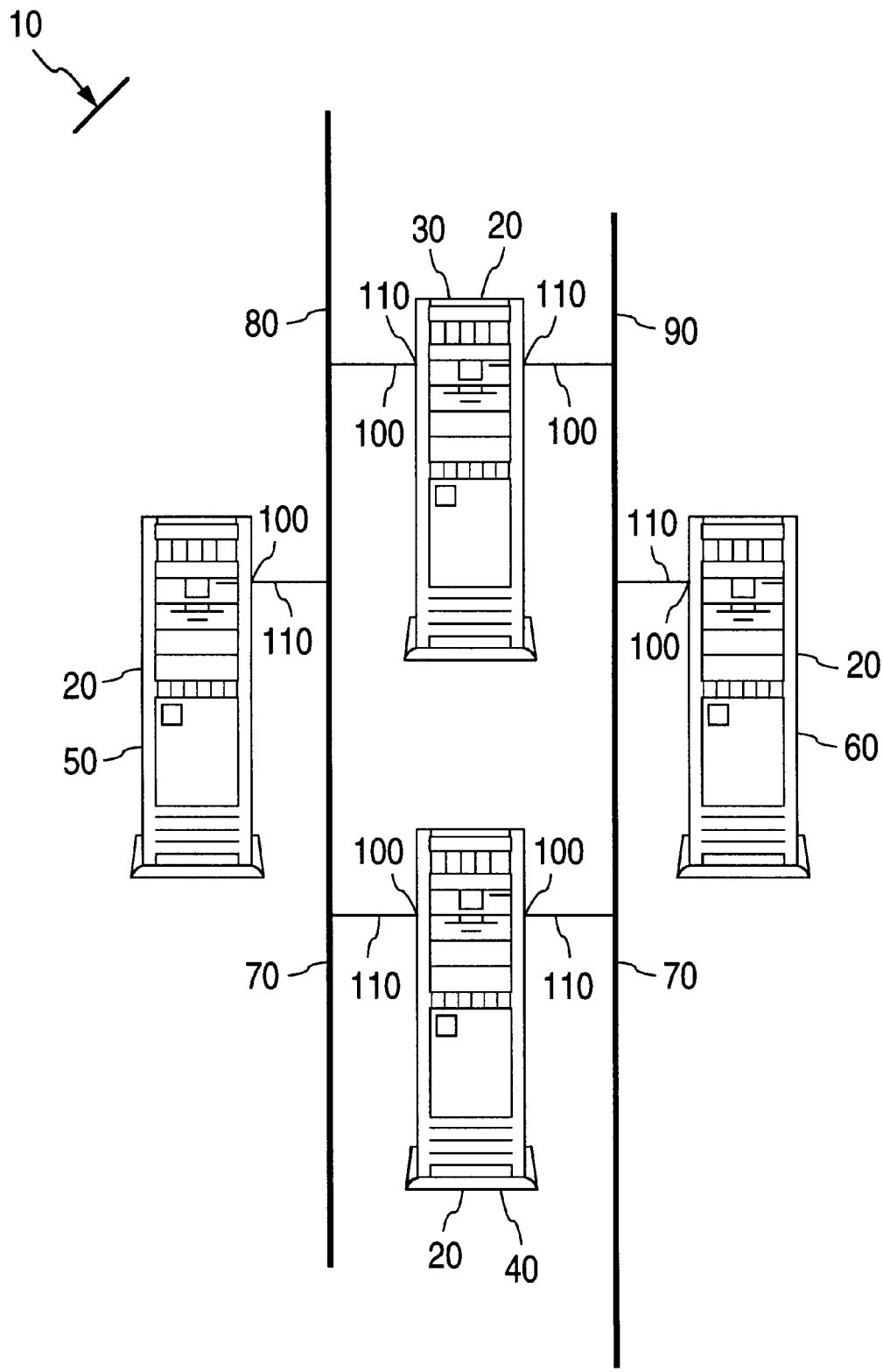
FIG. 1 is a block diagram depicting a basic 2×4net building block of the instant invention.

With reference to the drawings, wherein numeric references to like elements are preserved throughout the various drawings, a preferred embodiment of the present invention is described as follows:

Referring to FIG. 1, the basic 2×4net 10 of personal computers/workstations of the instant invention is depicted. In this embodiment, the 2×4net 10 comprises four nodes 20 which are identified for purposes of explanation herein as N1 30, N2 40, N3 50, and N4 60. This embodiment further comprises two ethernet segments 70, which are identified herein as Sg1 80 and Sg2 90. This preferred embodiment of the instant invention follows IEEE ethernet specifications for a network, i.e., standard ethernet network interface cards or NICs 100 are installed in commodity personal computers (nodes 20) and standard ethernet cables 110 connect the NICs 100. Applicant notes, however, that other standard network hardware such as UTP hubs instead of coax cables and Fastethernet (100 Mb/s) NICs with high-grade UTP hubs can also be used to build a 2×4net, since the network architecture and message passing software design of a 2×4net 10 is consistent with most standard networking hardware and software. Such variations are intended to be within the scope of the instant invention.

In all 2×4net 10, a message passing software system, ROCC+, is used for message-passing between nodes 20. The ROCC+ message passing software is capable of handling multi-NIC nodes wherein two or more NICs are connected to two or more distinct ethernet segments. The ability to handle multi-NIC nodes in various message-passing operations is an essential feature of the ROCC+ message passing system and is enabled through a ROCC_Environ subroutine which sets up communication links between the various nodes 20 of a 2×4net 10. The ROCC+ system uses the Sockets paradigm, known to those skilled in the art, to establish communication links between nodes.

The 2×4net 10 architecture is based on multi-NIC nodes 20 which can communicate with other nodes on different ethernet segments 70. As noted above, the basic 2×4net 10 building block of the preferred embodiment has two cable segments 70 (or hubs). This permits concurrent message-passing for different pairs of nodes 20, as will be further explained hereinbelow. The use of the Sockets paradigm with respect to the preferred embodiment requires that the nodes 20 run under an operating system which implements this paradigm. There are, however, non-proprietary operating systems that include Sockets; for proprietary systems, the usual licensing is available to a user of a 2×4net. As well, Applicant envisions that other paradigms for establishing communication links between nodes may be utilized without departing from the spirit or scope of the instant invention.

The Sockets paradigm permits a communication link CL(i,j) to be established between a client node j and a server node i which are physically connected. The terms "client" and "server" are here used in conformance with standard Sockets specifications, but need not connote the usual client-server relation. Indeed, as used herein, a communication link CL is any two-way message passing communication path between nodes (e.g., CL(i,j) indicates a message passing link between nodes i and j, such as from i to j, or from j to i). A communication link comprises software as well as hardware.

In accordance with the preferred embodiment, nodes N1 30 and N2 40 of the basic 2×4net 10 each have two NICs 100, one connected to segment Sg1 80 and the other to segment Sg2 90; node N3 50 has one NIC 100 connected to segment Sg1 80 and node N4 60 has one NIC 100 connected to segment Sg2 90.

To permit each node 20 to communicate with all the other nodes 20, which is the most critical case of connectivity that may be encountered in an application, the ROCC+ message passing software sets up communications links, using appropriate sockets, between node N1 30 and node N3 50 on segment Sg1 80, between node N2 40 and node N3 50 on segment Sg1 80, between node N1 30 and node N4 60 on segment Sg2 90, and between node N2 40 and N4 60 on segment Sg2 90. These communication links suffice for passing messages between any pair of nodes 20 in the 2×4net 10, including between nodes N3 50 and N4 60, by relaying messages. Furthermore, message passing for fully-connected applications is efficient on the basic 2×4net, as will be explained in further detail hereinbelow.

Application of a single 2×4net 10 of the instant invention may be better understood from the following example which is not intended to be, and is not, limiting of the scope of application of the instant invention. Considering an application problem of size n, that is, requiring updating n state variables in each step of a sequence of calculation steps (this is a typical format of large-scale, i.e., large n, compute-intensive applications programs), the applications programmer would assign a load-balance of n/4 states per node assuming, for illustrative purposes, that all nodes are of equal speed and all states are of equal computational complexity. The states on node N1 30 and node N3 50 may be identified as "odd" and the states on node N2 40 and node N4 60 may be identified as "even". In each calculation step, all four nodes 20 compute updated state values in parallel. Each node 20 then sends its n/4 updated states as a single message to the three other nodes. This message passing procedure is done in two successive time "phases" which can be described graphically—using semicolon notation for sequential execution and braces notation { }||{ } for parallel execution of the bracketed message passing procedures—as follows:

Phase 1: {1→3; 3→1 on Sg1 }||{2→4; 4→2 on Sg2}; and,

Phase 2: {1→4; 4→1 on Sg2 }||{2→3; 3→2 on Sg1}.

Expanding this notation, in Phase 1, 1→3; 3→1 denotes that node N1 30 sends to node N3 50 first and then node N3 50 sends to node N1 30, both on segment Sg1 80; and, in parallel, 2→4; 4→2 denotes that node N2 40 sends to node N4 60 first and then node N4 60 sends to node N2 40, both on segment Sg2 90. Similarly, in Phase 2, node N1 30 sends to node N4 60 first and then node N4 60 sends to node N1 30, both on segment Sg2 90; and, in parallel, node N2 40 sends to node N3 50 first and then node N3 50 sends to node N2 40, both on segment Sg1 80. The existence of two segments makes parallel (concurrent) message passing possible, while the phasing eliminates collisions (contention) on the two segments.

The synchronization of message passing is done by using the Sockets blocking send/receive mode. Note that node N3 50 and node N4 60 do not need two NICs 100, as would be the case in some other two-segment networks. If full-duplex NICs 100 and software are available on nodes N1 30 and N4 60, then these two send operations can be overlapped in time, as is similarly the case for the other pairs of send operations; thus, cutting the communication time nearly in half.

In Phase 1, all odd states are united on odd nodes 20 via segment Sg1 80, while all even states are united on even nodes 20 via segment Sg2 90, in parallel. In Phase 2, the union of odd and even states is done on all nodes 20, again using segment Sg1 80 and segment Sg2 90 to send messages in parallel. Further, in Phase 1, all message-lengths are bxn/4, where there are b bytes per state. To simplify notation, the b is suppressed so that message-lengths are just n/4. In Phase 2, all message-lengths are n/2, since all odd states are sent in one message, as are all even states, by the respective odd and even nodes 20 shown. This novel message passing logical algorithm is carried out by the ROCC+ message passing software of the preferred embodiment in a unique implementation of the standard single collective message passing operation in MPI which is designated "all-gather" and is known to those skilled in the art of cluster applications programming. In accordance with the instant invention, the all-gather is programmed, in the application program, so as to be executed concurrently by all the node 20 subprograms at the end of each calculation step. The ROCC+ software implements the all-gather on a single 2×4net 10 as just described, taking advantage of the 2×4net 10 architecture.

In many applications, the all-gather operation is a critical message passing operation to perform in a time-efficient, cost-effective way. As further described hereinbelow, the various embodiments of the instant invention accomplish this for the all-gather, as well as for other related collective multi-node message passing operations that are becoming standard in programming cluster applications. The efficiency of the integrated 2×4net hardware-software implementation of the all-gather operation has been confirmed by actual benchmark tests and by analysis done by Applicants. A summary of the analysis of all-gather communication time on a 2×4net 10 is provided immediately hereinbelow.

In any cluster of p nodes, the minimum number of bytes that must be transmitted to implement all-gather depends only on both the value of p and on the problem size, n, but, in a fully-connected, balanced application, does not depend on the network topology. Each node must send n/p states to p−1 nodes, a total of p(n/p) (p−1)=n(p−1) bytes that need to be sent per calculation step, assuming an iterative computation is being done. For p=4, this means 3n bytes per iteration step if, as stated above, the factor of b bytes per state is suppressed.

Considering next a 2×4net 10 in accordance with the instant invention, there are 4(n/4)=n bytes passed in 4 messages in Phase 1. In Phase 2, there are 4(n/2)=2n bytes passed in the 4 messages. Thus, total bytes=3n, which is the minimum. Letting tr(n) be the transmission time for a message of length n, where tr(n)=n/bandwidth, then transmission time is 2tr(n/4) in Phase 1 and 2tr(n/2)=4tr(n/4) in Phase 2. Thus, total Transmission Time for a 2×4net=6 tr(n/4). The time to send a message also includes message-preparation time (i.e., time for loading buffers as well as fixed TCP/IP protocol overhead time (latency) to prepare a packet for a NIC); thus, for a message of length n, the preparation time is pr(n)=buf(n)+tcp, where buf(n) is proportional to n and tcp is a fixed system overhead time. Accordingly, pr(n/2)=buf(n/2)+tcp=2buf(n/4)+tcp=2pr(n/4)−tcp<2pr(n/4). For large n, we can approximate, taking pr(n/2)=2pr(n/4). For a 2×4net, then, the preparation time is 2pr(n/4) in Phase1 and 2pr(n/2)=4pr(n/4) in Phase 2. Thus, total message-preparation time for a 2×4net=6pr(n/4). This reduces communication overhead compared to that of a single-segment cluster of 4 nodes using the best message passing procedure, the dance party algorithm, in which three successive "rounds" are needed. In each round, 4 messages are sent (i.e., 2 pairs of nodes exchange n/4 states). These must be sequentially transmitted on the single segment for a total transmission time 12tr(n/4), which is double the 2×4net time, as expected. In each round, the message-preparation is done in parallel on 2 nodes, 2 messages at a time, so that for each round the preparation time is 2pr(n/4). For 3 rounds, the total preparation time is 6pr(n/4), which is about the same as the 2×4net for large n. If tap is taken into account, the 2×4net preparation time is 6pr(n/4)−2tcp, so again the 2×4net 10 of the instant invention does better.

Figure 2:
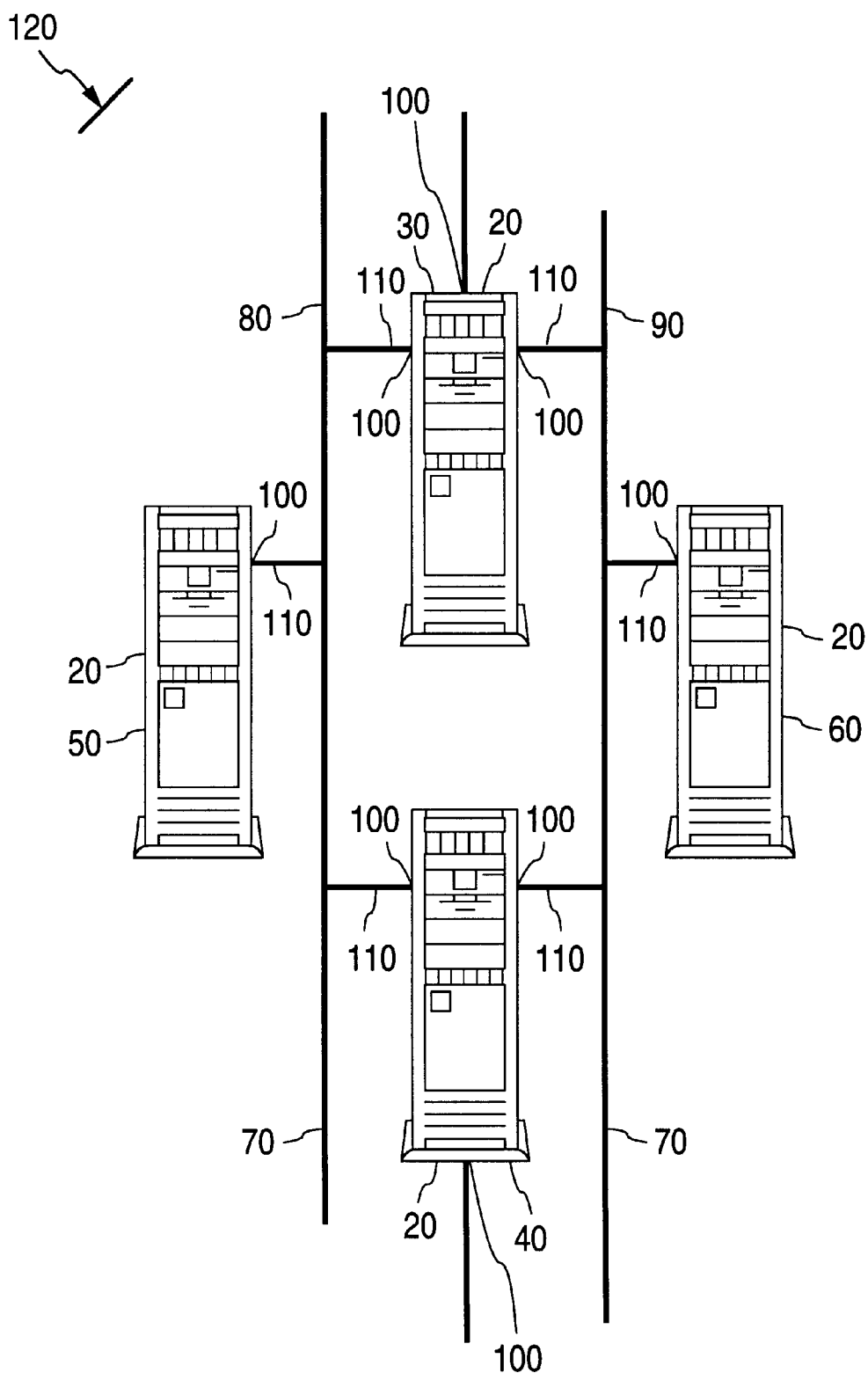
FIG. 2 is a block diagram depicting a 2×4+net configuration of the instant invention for use in interconnecting 2×4net building blocks.
Figure 3:
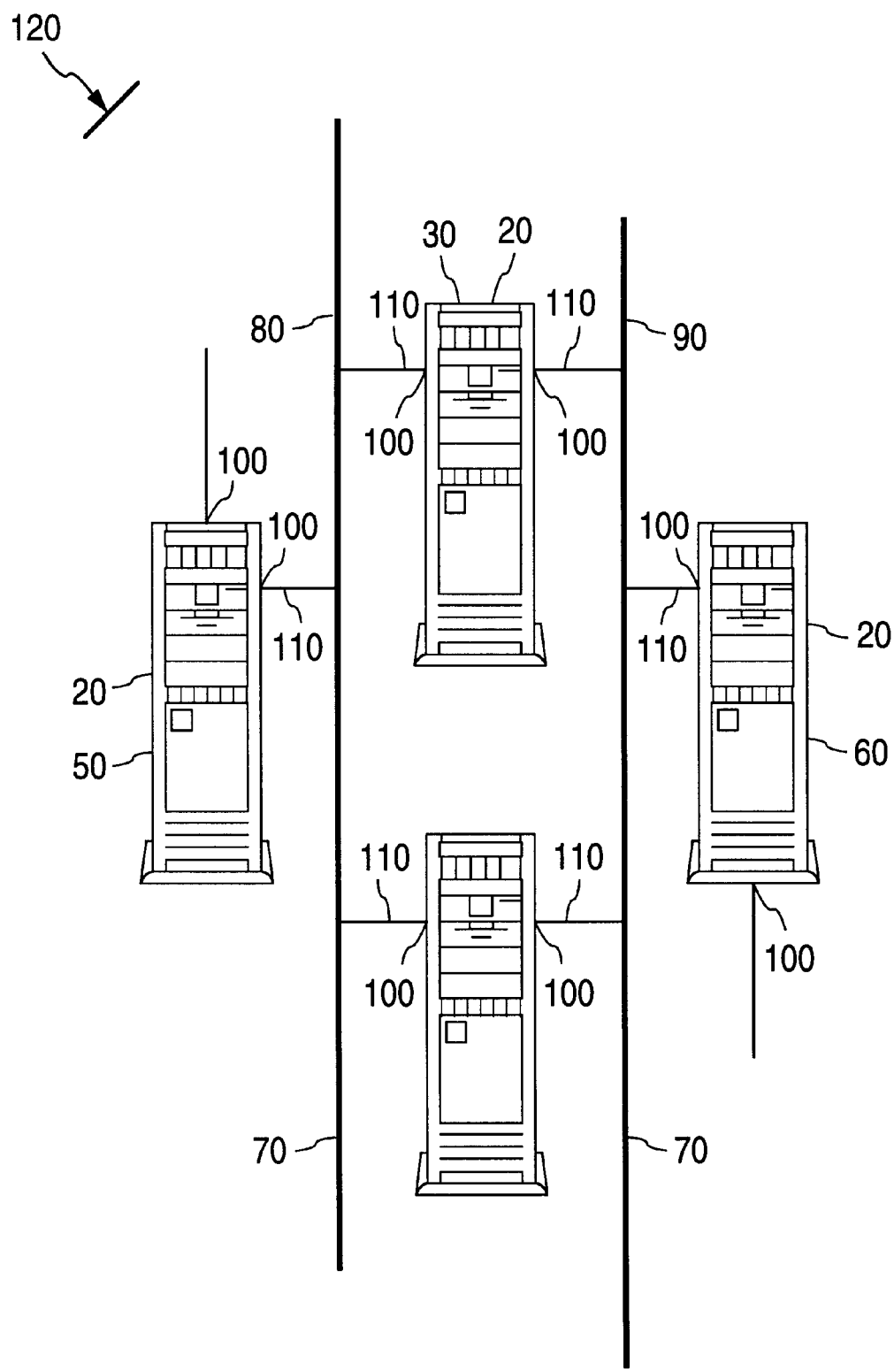
FIG. 3 is a block diagram depicting a alternative, balanced embodiment of a 2×4+net configuration of the instant invention for use in interconnecting 2×4net building blocks.

As indicated previously, a 2×4net 10 provides a computing platform to carry out parallel-distributed computation to execute compute-intensive programs. Further, the network architecture of the 2×4net 10, in conjunction with the integrated ROCC+ message passing software system achieves both efficient (cost-effective) and scalable speedup (as used herein, scalability refers to the important requirement that the size of a 2×4net-based cluster system can be increased in proportion to the problem size to maintain speedup without loss of efficiency). Scaling of 2×4nets in accordance with the preferred embodiment is accomplished by interconnection of modified 2×4nets. Such modified 2×4nets, designated herein as a 2×4+net 120, are illustrated in FIGS. 2 and 3 (representing alternative embodiments to effect scaling of 2×4net cluster systems in accordance with the instant invention). As may be seen, the modification comprises the addition of two NICs 100, one each to two nodes 20 of a 2×4net 10, and associated ethernet cables 110. When combined, such 2×4+nets 120 serve as supernodes in the overall system architecture (which may, in turn, be arranged in accordance with several known network architecture schemes, such as a ring or a torus, with the ROCC+ message passing software controlling communication links accordingly to effect efficient computation). It should be noted that the addition of NICs 100 in this manner should not be problematic since most personal computers/workstations have slots which may accommodate up to four NICs 100.

In a first embodiment, illustrated in FIG. 2, the 2×4+net 120 is effected by the addition of a third NIC 100 in both nodes N1 30 and N2 40. The communication links within the 2×4+net 120 are the same as previously discussed with respect to the 2×4net 10. In an alternative embodiment, illustrated in FIG. 3, a balanced 2×4+net 120 can be built by inserting a second NIC 100 in each one-NIC node 20, i.e., node N3 50 and N4 60. In either embodiment, the new NICs 100 will be used to connect one 2×4+net 120 to another.

As an illustrative example (not shown), the case of two 2×4+nets 120 is considered first, assuming the 2×4+net 120 embodiment of FIG. 2. As before, the nodes 20 of the first 2×4+net 120 are identified as N1 30, N2 40, N3 50, and N4 60. The nodes 20 of a second 2×4+net 120 may be identified as N5, N6, N7, and N8 (corresponding to nodes N1, N2, N3 and N4, respectively, of the first 2×4+net 120), with nodes N5 and N6 each having three NICs 100, as do nodes N1 30 and N2 40 in the first 2×4+net 120. As before, the two segments 70 in the first 2×4+net 120 are identified as Sg1 80 and Sg2 90; the two segments 70 in the second 2×4+net 120 may be identified as Sg3 and Sg4 (corresponding to Sg1 and Sg2, respectively). Connection of the two 2×4+nets 120 in this embodiment is effected by connecting the third NIC 100 of node N1 30 to segment Sg3, the third NIC 100 of node N5 to segment Sg1 80, the third NIC 100 of node N2 40 to segment Sg4, and the third NIC 100 of node N6 to segment Sg2 90. This physically connects the two 2×4+nets in a daisy-chain of length 2, wherein the two "daisy's" are the 2×4+nets 120, and wherein the daisy-chain may be viewed as a ring of supernodes. Next, additional communication links are set up by the ROCC+ message passing software as follows: Sg1: CL(5,3); Sg2: CL(6,4); Sg3: CL(1,7); and, Sg4: CL(2,8), which completes the hardware-software connections for the chain network of two 2×4+nets in accordance with this embodiment.

The ROCC+ message passing software implements the all-gather for such a network as detailed hereinbelow, again assuming a balanced load distribution of an application of size n (Applicants note that if a balanced loading is not possible, a variation of the algorithm will do a close approximation to the following procedure). There are now n/8 states updated on each node. Each node sends its updated states to all other nodes by the concurrent execution of all-gather. The ROCC+ software implements all-gather as follows: Phases 1 and 2 in each 2×4+net 120 are as previously described with respect to the standard 2×4net 10 above. Thus, the state sets on each 2×4+net 120 are combined in parallel, forming the unions of the four subsets updated on each node 20 of each 2×4+net 120. The n/2 states in each union are stored in buffers on each node, as will be explained later. The times for these phases are computed to be:

Transmission time=6tr(n/8)=3tr(n/4), Phases 1+2; and,

Preparation time=6pr(n/8)=3pr(n/4), Phases 1+2. There is, however, an additional phase, Phase 3, performed next in order to combine the states on the 2×4+nets 120. Using like nomenclature as defined above, Phase 3 may be graphically represented as {Sg1: 3→5;5→3}||{Sg2: 4→6;6→4}||{Sg3: 1→7;7→1}||{Sg4: 2→8;8→2}.

As before, it may be readily determined that the message length in Phase 3 is n/2, the Transmission time for Phase 3 =2tr(n/2)=4tr(n/4), and the Preparation time for Phase 3=2pr (n/2)=4pr(n/4). Thus, Total Transmission time for two connected 2×4+nets=7tr(n/4) and Total Preparation time for two connected 2×4+nets=7pr(n/4). This compares favorably to 6tr(n/4) and 6pr(n/4) for one 2×4net. Since the number of nodes has been doubled, the parallel calculation time is cut by about one-half (in balanced problems), whereas the communication time is only increased in the ratio 7/6. Thus, the 2×4+net 120 design does markedly reduce communication overhead. In similar manner, it may be readily determined that larger clusters may be accommodated through scaling with corresponding results.

A variety of alternative embodiments may be envisioned to provide scaling in accordance with the instant invention. In all cases, scaling involves increasing the number of nodes, p. For example, one alternative is to effect the scaling of 2×4+nets 120 by this design to extend to any number, m, of 2×4+nets 120 through a daisy-chain of m 2×4+nets 120. Another alternative would be to effect scaling by adding a fourth NIC to the multi-NIC nodes to permit torus nets. A third alternative, though not preferred for reasons noted below, would be to utilize standard scaling methods and, thus, to increase the number of 1-NIC nodes on each segment.

In this latter regard, for example, the number of nodes may be increased to provide a 2×8 network by adding nodes N5 and N7 to Sg1 and nodes N6 and N8 to Sg2. Additional communication links, i.e., CL(1,5), CL(1,7), CL(2,5), CL(2, 7) on Sg1 and similarly for Sg2 would then be set up. In such embodiment, in order to pass all states to all nodes, there would be 3 rounds in Phase 1 to use both segments. In each round, the preparation is done in parallel on different nodes but the transmission is sequential, as enforced by the ethernet CSMA/CD protocol. Thus, with respect to segment Sg1, Phase 1 would be graphically represented as: {1→3; 3→1} ∥ {5→7; 7→5} in Round 1, {1→5; 5→1} ∥ {3→7; 7→3} in Round 2, and {1→7; 7→1} ∥ {3→5; 5→3} in Round 3; and similarly with respect to segment Sg2 using even nodes in Rounds 1–3. As in the 2×4net, Phase 1 unions all odd states on all odd nodes and even states on even nodes. But now two more Phases are needed to perform the odd-even unions, i.e., Phase 2: {1→4; 4→1 on Sg2} ∥{2→3; 3→2 on Sg1} and Phase 3: {1→6; 4→8 on Sg2} ∥{2→5; 3→7 on Sg1}. In accordance with this embodiment, message lengths are n/8 in Phase 1 and n/2 in Phases 2, 3, transmission time is 12tr(n/8) in Phase 1 and 2tr(n/2) in each of Phases 2 and 3, and Total transmission time on a 2×8= 14tr(n/4). Further, message preparation time in Phase 1=3× 2pr(n/8)=3pr(n/4) (approx) and in Phases 2 and 3=2pr(n/2) =4pr(n/4) each; thus, total message preparation time on such a 2×8=11pr(n/4). Accordingly, communication time approximately doubles for the 2×8. As well, there is no gain in having two NICs on nodes 3–8. If communication time increases approximately linearly with p and calculation time decreases linearly, there will be a low optimum value of p beyond which speedup decreases. Thus, this method of scaling is relatively ineffective, particularly in comparison to the other alternative embodiments described in further detail hereinbelow.

A daisy-chain is of the generic network type called a ring in the literature on parallel architectures (see, e.g., Parallel Algorithms and Architectures by M. Cosnard & D. Trystram, International Computer Press 1995, which is incorporated by reference as though fully set forth herein). The ring, as well as the torus network, are two generic multi-processor architectures. The ring is a 1-dimensional regular closed loop of nodes, whereas the torus net is a regular 2-dimensional grid of nodes like the well-known mesh architecture, but laid out on a torus (donut) surface rather than a plane. Prior implementations that have been based on these architectures have been built as single super-computers using special processor nodes and special communication hardware-software. The corresponding theoretical message passing algorithms have been framed in an abstract setting that does not fully take into account real-world constraints. However, the instant invention is directed to specific implementations of clusters built from commodity personal computers/workstations as the nodes of various multi-segment ethernet networks with matching message passing software. In this regard, the 2×4net daisy-chain embodiment comprises a specific ring-type architecture with 2×4+net building blocks as "supernodes" of a ring. Likewise, scaled systems utilizing torus-type networks, designated herein as 2×4torusnets, are envisioned using a further modified 2×4net, designated herein as a 2×4++net, as supernodes. All communication is by message-passing over multiple ethernet segments (standard cables or hubs).

The various computing platforms represented by these latter 2×4net clusters differ essentially from the supercomputers that have logical ring or torus type architectures. The 2×4net clusters of the instant invention are assemblages of commodity personal computers/workstations which are interconnected by commodity networking hardware. The basic interconnection unit is the 2×4net or 2×4++net building block, functioning as a supernode. These supernodes allow interconnections, as further explained below, to form daisy-chain and super-torus networks. In other computer networks, the nodes are usually single processors, or some possibly have a special switching processor as well. In textbook rings, the nodes are usually of a simple kind. Various algorithms for all-gather on such simple rings are based on assumptions about the send/receive capabilities of a node. A simple node usually cannot send and receive simultaneously. All-gather on such a simple ring of length N for a problem having n states would proceed in N/2 phases. In phase 1, nodes 2i−1 and 2i (i=1, . . . ,N/2) combine their n/N states in parallel. In phase 2, nodes 2i and 2i+1 combine their 2n/N states. In phase 3, nodes 2i−1 and 2i again exchange messages but only passing the 2n/N states that the other does not already have. This alternating pattern of message passing continues for N/2 phases until all nodes have all states. Assuming that the time to pass a message of length q is L+rq, where L is a latency, the time for a phase is L+2nr/N. The total time for N/2 phases is NL/2+rn(1−1/N). As will be described in further detail below, the 2×4daisy-chain reduces the latency term by ½. For many applications and commodity hardware-software components, this results in significant increases in efficiency.

The case of a daisy-chain of two 2×4+nets was previously described in detail hereinabove. The general case of any number, e.g., m, of 2×4+nets connected in a daisy-chain can best be described with reference to FIG. 4, which illustrates a larger scaling application of a 2×4+net embodiment as illustrated in FIG. 2. As well, another 2×4+net daisy chain embodiment may be realized utilizing the 2×4+net embodiment illustrated in FIG. 3; such daisy chain embodiment is illustrated in FIG. 5.

Figure 4:
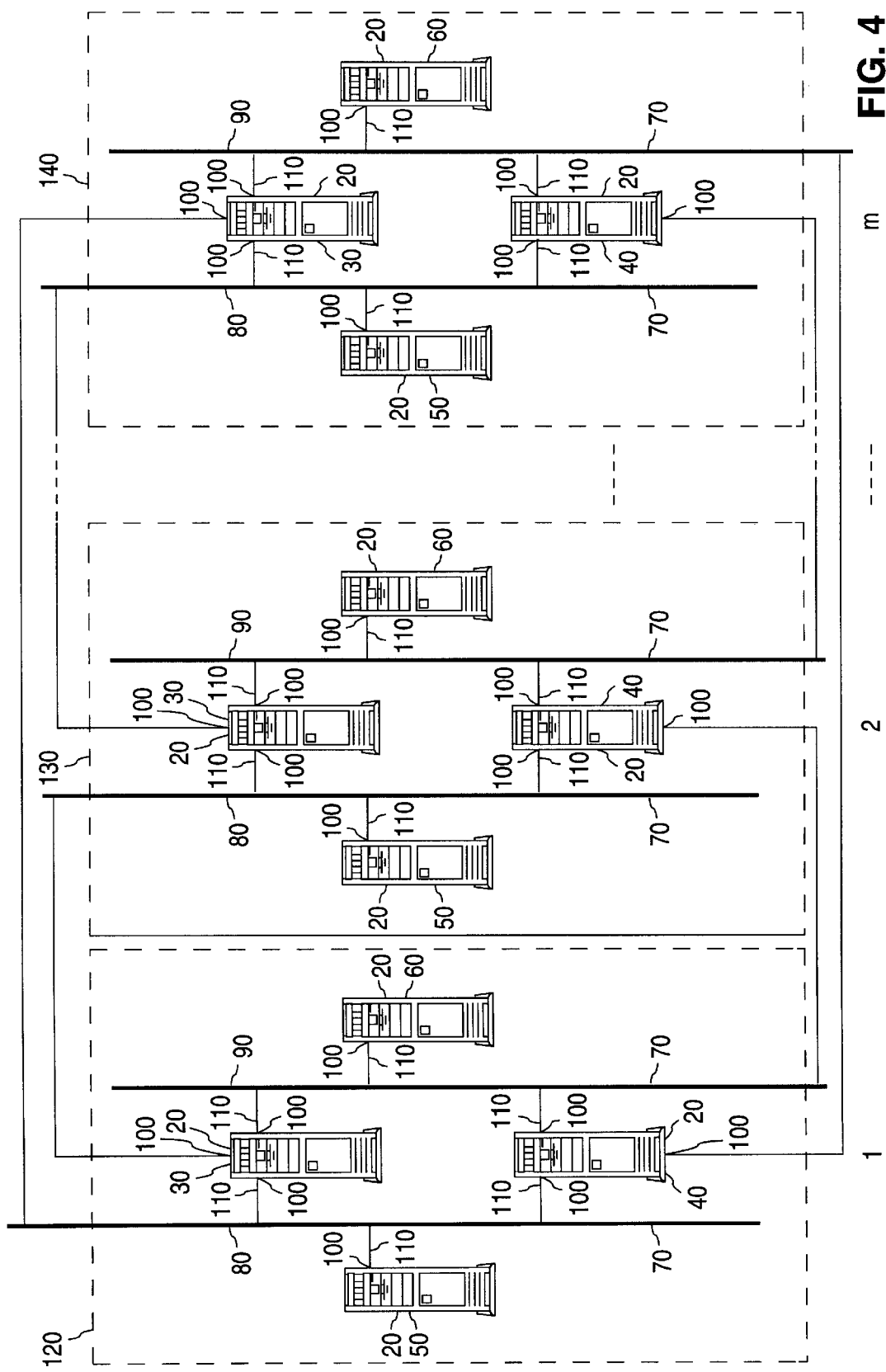
FIG. 4 is a block diagram depicting a 2×4+ Ring of the instant invention in which m groups of 2×4+net building blocks are interconnected for larger scale parallel-distributed computation; and, FIG. 5 is a block diagram depicting a 2×4+ Ring of the instant invention in which m groups of 2×4+net building blocks, in accordance with the embodiment of FIG. 3, are interconnected for larger scale parallel-distributed computation.

In general, and with reference to FIG. 4, with respect to the ith 2×4+net in the chain (where i=1 to m), the third NIC 100 of each corresponding node N1 30 is connected to the corresponding segment Sg1 80 of the i+1th 2×4+net; thus, e.g., the third NIC 100 of node N1 30 of the first 2×4+net 120 is connected to segment Sg1 80 of the second 2×4+net 130. As well, the third NIC 100 of each corresponding node N2 40 is connected to the corresponding segment Sg2 90 of the i+1th 2×4+net; thus, e.g., the third NIC 100 of node N2 40 of the first 2×4+net 120 is connected to segment Sg2 90 of the second 2×4+net 130. In this embodiment, connections between each of the m 2×4+nets are made in like manner. With respect to connection of the final (m) 2×4+net 140, the chain loop is closed by considering the first 2×4+net 120 to be the i+1th cluster, thus, the third NIC 100 of node N1 30 of the final 2×4+net 140 is connected to segment Sg1 80 of the first 2×4+net 120, and the third NIC 100 of node N2 40 of the final 2×4+net 140 is connected to segment Sg2 90 of the first 2×4+net 120. Similarly, for the first 2×4+net 120, the "previous" 2×4+net is considered to be the final (m) 2×4+net 140. As the remainder of the hardware connections are identical to those previously detailed with respect to the single 2×4net 10, the physical network architecture of this scaling embodiment is completed. As before, the physical hardware connections can be standard coax cable or UTP wires connected through small hubs by is standard RJ45 jack connections.

Communication links are set up by the ROCC+ message passing software in a pattern which generalizes the links in the chain of two 2×4+nets. For the ith 2×4+net, this means that there is a communication link joining nodes N1(i) and N3(i+1) and a communication link joining N2(i) and N4(i+1); addition is modulo m, to close the chain loop. The ROCC+ software establishes these communication links using the IP addresses of the appropriate NICs 100. The Sockets paradigm still works for these node pairs, as does the TCP/IP protocol. This completes the software-hardware communication links of the nodes of a 2×4+net daisy chain of arbitrary length m.

FIG. 5 illustrates the connections to be made if the balanced 2×4+nets of FIG. 3 are used as supernodes. In this regard, connections between supernodes would be from node N3(i) to segment Sg1(i+1) and from node N4(i) to segment Sg2(i+1), both using the second NIC 100 in these respective nodes N3 and N4. Applicants note, further, that variations of the above connection architecture which still yield a ring of supernodes are possible, such as connecting node N4(i) backward to segment Sg2(i−1). Such variations do not depart from the spirit of the instant invention and are intended to be within its scope.

Implementation of all-gather on a 2×4+net daisy chain of length m, in accordance with the instant invention, is accomplished as follows. Each 2×4+net node 20 has a buffer, buf, of length nb bytes to store the n states. As before, the factor b will be suppressed to simplify notation. Each node updates n/4m=q states in each calculation step, assuming perfect load balancing. Its buffer is divided into m contiguous sections buf(1), . . . ,buf(m), each of length 4q. At the end of a calculation step, each node, N1(i), N2(i), N3(i), N4(i) of the ith 2×4+net (where i=1, . . . ,m) will have placed its q updated states in the appropriate quarter of section buf(i) of its own buffer; e.g. node N1(i) in the first quarter, N3(i) in the second quarter, N2(i) in the third quarter and N4(i) in the fourth quarter. It is noted that this ordering of quarters is arbitrary; any permutation can be specified by the user. The other parts of the buffer still have the previous values of the other states. At this point, each node 20 calls the all-gather function, which will then distribute its updated states to all other node buffers and cause their updated states to be received in its appropriate buffer sections. The ROCC+ software executes the all-gather by doing send/receive operations in a partly synchronized concurrent mode on all nodes. The necessary synchronization is done by using blocking send and receive operations provided by the Sockets paradigm. The essential features of the ROCC+ all-gather function are described here using a pseudo programming notation. The actual program is written in the C language; source code is provided herewith in the microfiche appendix. It will be obvious that minor variations in the following program are possible and are deemed within the scope of the instant invention since they are inherent in the integrated software-hardware design of a 2×4+net daisy chain. While it is possible that there are other implementations of the all-gather operation on clusters, or other computer platforms employing a ring-type architecture, that is, a connectivity of processor elements that forms some sort of a closed loop, the unique 2×4+net daisy chain embodiment detailed herein may be characterized as having a generic ring-type architecture, but which differs in essential connectivity details from other ring networks. Likewise, the implementation of the all-gather operation, described below, differs essentially from other implementations of all-gather on ring-type computing models.

With respect to a 2×4+net daisy chain of length M, all-gather is executed in M+1 successive phases. Except for Phases 1 and 2, the odd and even number phases 3,4,5,6, . . . , M+1 alternate between a message "shift" phase and a message "merge" phase. A shift phase passes messages between 2×4+net (i) and 2×4+net (i+1), for i=1, . . . ,M, in parallel on distinct network segments. A merge phase passes messages between nodes within each 2×4+net (i), i=1, . . . , M, again in parallel on distinct segments. These messages are the updated states required to fill all buffer sections in all node buffers prior to the next calculation step. Messages are passed between pairs of nodes by means of the ROCC+ software's send/receive function calls issued and executed in parallel on the multiple segments. The ROCC+ software's send/receive function calls have a conventional format in which the call parameters are a buffer address, length of message and remote node address (to be sent-to or received-from). The buffer address is varied in a logical order as the successive phases are executed. Each phase is executed by each 2×4+net (i) concurrently, as detailed below. In this example, as in the Microfiche Appendix, node N1 is referred to as "u" for "up" node, node N2 is referred to as "d" for "down" node, node N3 is referred to as "l" for "left" node, node N4 is referred to as "r" for "right" node, segment Sg1 is referred to as "SgL" for left segment, segment Sg2 is referred to as "SgR" for right segment. Further, "send" denotes the send function call and "recv" denotes the receive function call. The notation buf (i,jq) denotes the jth quarter of section buf(i),j=0,1,2,3.

Phase 1 program on 2×4+net(i):

u(i): send(buf(i,0), q, l(i)); recv(buf(i,q), q, l(i));

l(i): recv(buf(i,0), q, u(i)); send(buf(i,q), q, u(i));

d(i): send(buf(i,2q),q,r(i)); recv(buf(i,3q), q, r(i)); and, r(i): recv(buf(i,2q),q,d(i)); send(buf(i,3q), q, d(i)).

Using the message passing notation identified earlier, Phase 1 can be described as {u(i)→l(i); l(i)→u(i) on SgL (i)}∥{d (i)→r(i); r(i)→d(i) on SgR (i)}, without showing buffers. These message passing operations are done in parallel for all i=1, . . . ,M, since they are done on separate segments by the different nodes executing concurrently.

Phase 2 program:

u(i): send(buf(i,0), 2q, r(i)); recv(buf(i,2q), 2q, r(i));

r(i): recv(buf(i,0), 2q, u(i)); send(buf(i,2q),2q, u(i));

d(i): send(buf(i,2q), 2q, l(i)); recv(buf(i,0), 2q, l(i)); and, l(i): recv(buf(i,2q), 2q, d(i)); send(buf(i,0), 2q, d(i)).

Phases 1 and 2 have the same message passing pattern as the basic 2×4net 10, which was detailed hereinabove. At the end of Phase 2, section buf(i) of the buffer on each node of 2×4+net (i) contains all 4q states updated by the four nodes of 2×4+(i). In the phases which follow, entire buffer sections will be shifted between one 2×4+net and the next, in messages passed between nodes on one 2×4+net and the next, and then merged with other sections by passing messages between nodes on the same 2×4+net. By a sequence of alternating shift and merge phases each buffer on each node is completely updated and the next calculation step of the application program begins.

The following ROCC+ message passing software program is executed on the nodes of each 2×4+net (i) in parallel within a phase and sequentially for the phases 3+k, k=0, . . . , M−2. The shift phases are for k even and the merge phases are for k odd.

For k=0, . . . , M−2 \*phases*\

If k is even then \*shift*\ u(i): send(buf(i−k/2), 4q, l(i+1));

recv(buf(i+1+k/2), 4q, l(i+1))

d(i): send(buf(i−k/2), 4q, r(i+1));

recv(buf(i+1+k/2), 4q, r(i+1))

l(i): recv(buf(i−1−k/2), 4q, u(i−1));

send(buf(i+k/2), 4q, u(i−1))

r(i): recv(buf(i−1−k/2), 4q, d(i−1));

send(buf(i+k/2), 4q, d(i−1))

else \* k is odd, do merge*\ u(i): send(buf(i+1+(k−1)/2),4q, l(i));

recv(buf(i−1−(k−1)/2),4q, l(i))

d(i): send(buf(i+1+(k−1)/2),4q, r(i));

recv(buf(1−1−(k−1)/2),4q, r(i))
l(i): recv(buf(i+1+(k−1)/2),4q,u(i));
send(buf(i−1−(k−1)/2),4q,u(i))
r(i): recv(buf(i+1+(k−1)/2),4q,d(i));
send(buf(i−1−(k−1)/2),4q,d(i))

The previously identified notation may be used to show the segments involved in executing this unique parallel message passing procedure made possible by the 2×4+net daisy chain architecture and software communication links. Thus, in a shift phase:

{u(i)→l(i+1);l(i+1)→u(i):SgL(i+1)}||{d(i)→r(i+1);r(i+1)→d(i):SgR(i+1)} for i=1, . . . , M in parallel. (Note M+1=1 modulo M.)

In a merge phase:

{u(i)→l(i);l(i)→u(i): SgL(i)}||{d(i)→r(i); r(i)→d(i):SgR(i)} for i=1, . . . ,M in parallel. Note that both the merge and the shift phases make parallel use of all 2M available network segments in the M 2×4+net blocks. As noted earlier, if full-duplex NICs and driver software are available, communication time will be approximately halved in executing a shift and a merge phase. This is also a special feature of the 2×4+net daisy chain logical mode of internode communication for all-gather and other collective message passing operations.

A further variation of the 2×4+net daisy chain presented above comprises one in which node d(i) is physically connected backward in the chain to segment Sg2(i−1), instead of forward to segment Sg2(i+1). A shift phase then passes messages accordingly, and buffer addresses must be changed accordingly. Merges are similar to the above merges. Again, M+1 phases are needed to execute all-gather. Such variation is also intended to be within the scope of the instant invention, Consider an application of size 1,000×n states. If there are b bytes per state, then N=bn kilobytes are required to store all states. There are 4M processors in a 2×4+net daisy chain of M supernodes. Each processor updates N/4bM×1000 states or N/4M kilobytes. In phase 1, these bytes are exchanged between pairs of nodes in each supernode. This requires time 2(L+rN/4M). In phase 2, the merge of states in each supernode requires time 2(L+rN/2M). Then in phases 3, . . . ,M alternate shifts and merges each take time 2(L+rN/M). The total communication time for all-gather is therefore T(N,M)=2[(M+1)L+rN(1−¼M)]. To compare this with the all-gather on a simple ring of single-processor nodes, the simple ring must have length 4M. All-gather is done in 2M−1 shift phases passing messages of length N/2M and one initial merge phase passing messages of length N/4M . The latter takes time 2(L+rN/4M). The shifts take time (2M−1)2(L+rN/2M). The total time for all-gather is therefore Ts(N,4M)=2[2ML+rN(1−¼M)]. Comparing T(N, M) and Ts(N,4M), as noted above, the 2×4+net daisy chain reduces latency time by about ½ compared to the simple ring architecture.

A variation of all-gather that is useful in application problems is the neighbor-gather operation. This operation passes messages locally between nodes in a small neighborhood of each node. For example, each 2×4+net(i) may only need the updated states of 2×4+net(i+1) and 2×4+net(i−1), its nearest neighbors in the chain. One shift and merge will accomplish this. Two shift and merge phases will combine states of next-nearest neighbors as well, and so on. Again, the parallel message-passing provided by a 2×4+net daisy chain allows a unique parallel implementation of these operations. As well, other message passing operations are easily performed by modifying the all-gather procedure. For example, MPI standards include such operations as "group-all-gather" in which all-gather is restricted to a programmer-specified subset of nodes. The 2×4+net daisy chain as provided herein is especially effective for certain groupings of nodes that occur in application problems. For example, 2×4+net(i) may only need the updated states on its two nearest neighbors, 2×4+net(i−1) and 2×4+net(i+1). This can be accomplished by a restriction of all-gather, neighbor-gather(k), where k specifies the extent of the neighborhood. For nearest neighbors, k=1 and neighbor-gather(1) consists of one shift and one merge phase. For k=2, two shifts and merges will do, and so on.

For more general groupings of nodes to match the application state dependencies, other 2×4net architectures are indicated. In another series of embodiments of the instant invention, such networks may make use of a further modified 2×4net building block (i.e., a modified 2×4+net) designated herein as a 2×4++net. A 2×4++net consists of a 2×4+net in which an additional NIC 100 is added to each of two nodes 20. In one embodiment, corresponding to a modification of the 2×4+net illustrated in FIG. 2, these two additional NICs 100 may be added as fourth NICs to nodes N1 30 and N2 40 (as noted previously, the motherboards of most personal computers/workstations provide four slots for NICs; there are also newly developed cards which have four network interfaces on one card—accordingly, the 2×4++net modules can be built easily from commodity hardware). The balanced 2×4+net illustrated in FIG. 3 may also be modified by adding a third NIC 100 to each of nodes N1 30 and N2 40. These additional NICs 100 may be connected to other 2×4++net segments in different ways to produce many architectures without departing from the scope of the instant invention. As with all the 2×4nets, the hardware-software communication links with respect to either embodiment are easy to set up using the well-tested standard Sockets interface with TCP/IP. No special modifications of commodity operating system kernels is needed.

A first embodiment for scaling 2×4net-based clusters utilizing 2×4++nets is designated herein as a 2×4twin-daisynet. The 2×4twin-daisynet comprises two 2×4+net daisy chains, each of length M/2, coupled together by pairing 2×4++net modules in each chain, e.g., by using the fourth NICs 100 of the 2×4++net embodiment wherein a fourth NIC is added to each of nodes N1 30 and N2 40. In this 2×4twin-daisynet embodiment, the pairing connection is the same as that for connecting two 2×4+nets, as previously detailed. The all-gather operation can be performed with respect to a 2×4twin-daisynet in about half the time needed for a single 2×4+net daisy chain of length M, i.e., M/2+1 phases done in parallel on each chain plus two final phases to merge all states on all paired 2×4++net's. The 2×4twin-daisynet can also be used for group-gather in applications where there are two major groups of dependent states and only a few dependencies between the states in each group. The instant ROCC+ message passing software provides high-level programming tools for partitioning the state sets into two subsets to be loaded on each 2×4+net daisy chain, and for doing a new type of collective message passing, designated herein as bridged-group-gather, which updates states as required on the nodes of the 2×4twin-daisynet.

A natural extension of the 2×4twin-daisynet is a further embodiment designated herein as the 2×4torusnet. The 2×4torusnet has the architecture of a two-dimensional (2-d) toroidal (doughnut) surface. The nodes are arranged in a stack of horizontal 2×4+net daisy chains of equal length M. The stack layers are connected by vertical 2×4+net daisy chains connecting vertically aligned nodes in the layers. It is noted that the physical geometry need not be horizontal-vertical, but any arrangement which implements the same toroidal connectivity. As indicated previously, generic torus architecture is a generalization of the generic 2-d mesh, which is the architecture used in some supercomputers. As well, there already exist small 3-dimensional toroidal networks marketed as single computing platforms. As with the 2×4+net daisy chains, however, the instant invention derives from use of 2×4++ supernodes as building blocks to construct the physical 2×4torusnet network from commodity hardware, and in the use of the ROCC+ integrated message-passing software system to provide unique communication logic for efficient implementation of collective message passing operations. For example, all-gather is done in 2M+2 phases for a torusnet of M×M nodes. The M layers of 2×4+net daisy chains do their message-passing in M+1 parallel phases and then the M "vertical" 2×4+net daisy chains do their M+1 phases in parallel. Applicants note that other 2-d analogues of 1-d daisy chain message passing operations are available, such as the nearest-neighbor-gather.

The 2×4torusnets are scalable to very large networks and are easily reconfigurable to do group-gather operations for a variety of common application problems. One possible configuration that would be easily scalable is a stack of 2×4++net daisy chains of length 6; i.e., each 2×4++net daisy chain has 24 processors. The layers are connected into a torusnet as described. It is a simple matter to add new layers by simply disconnecting the old top and bottom layers. Also note that individual layers can be used to run several different applications concurrently, since there are no collisions of messages sent on different layers.

In a final aspect of the instant invention, a user interface is provided with any 2×4net-based cluster system. For this purpose an extra NIC 100 is added to each processor. These extra NICs 100 are all connected to a single segment bus which is used to load initial files on all processor nodes 20. This also allows the individual processors to be used independently, e.g., in the usual client-server LAN mode when the 2×4net applications are not running. The bus can also be used for node-to-node send/receive operations, although this will entail the usual bus contention.

Having described the invention in detail and by reference to preferred embodiments thereof, it will be apparent that other modifications and variations are possible without departing from the spirit and scope of the invention defined in the appended claims.

What is claimed is:

1. A computer network architecture system comprising:
   a first segment;
   a second segment;
   a first computer having two network interface cards associated therewith; said first computer being connected to said first network segment through a first of said two network interface cards, and said first computer being connected to said second segment through a second of said two network interface cards;
   a second computer having two network interface cards associated therewith; said second computer being connected to said first network segment through a first of said two network interface cards, and said second computer being connected to said second segment through a second of said two network interface cards;
   a third computer having one network interface card associated therewith, said third computer only being connected to said first segment through said one network interface cards; and a fourth computer having one network interface card associated therewith, said fourth computer only being connected to said second segment through said one network interface cards;
   wherein said first, second, third, and fourth computers cooperate to solve an application problem by each calculating interim results and then exchanging messages including the interim results using a two phase message passing protocol in which:
       during a first phase of said two-phase message passing protocol, said first computer and said third computer exchange messages on said first network segment and said second and said fourth computer exchange messages on said second network segment;
       during a second phase of said two-phase message passing protocol, said first computer and said fourth computer exchange messages on said second network segment and said second computer and said third computer exchange messages on said first network segment.

2. The system of claim 1 wherein said first, second, third and fourth computers, respectively, comprise personal computers.

3. The system of claim 1 wherein said first, second, third and fourth computers, respectively, comprise workstations.

4. The system of claim 1 wherein said first and second segments, respectively, comprise ethernet cable.

5. The system of claim 1 wherein said first and second segments, respectively, comprise hubs.

6. A computer network architecture system comprising m supernodes, wherein m is an integer greater than one, each of said m supernodes further comprising:
   a first segment;
   a second segment;
   a first computer having at least two network interface cards associated therewith, said first computer being connected to said first segment through a first of said at least two network interface cards, and said first computer being connected to said second segment through a second of said at least two network interface cards;
   a second computer having at least two network interface cards associated therewith, said second computer being connected to said first segment through a first of said at least two network interface cards, and said second computer being connected to said second segment through a second of said at least two network interface cards;
   a third computer having at least one network interface card associated therewith, said third computer being connected to said first segment through a first of said at least one network interface card; and,
   a fourth computer having at least one network interface card associated therewith, said fourth computer being connected to said second segment through a first of said at least one network interface card;
   means for interconnecting said m supernodes; and wherein said means for interconnecting comprise a third network interface card associated with each of said first and second computers of each of said m supernodes for use in connecting said m supernodes in a daisy-chain.

7. The system of claim 6 wherein said third network interface card of said first computer of the ith supernode, wherein i=1 to m, is connected to said first segment of the i+1th supernode, said third network interface card of said second computer of said ith supernode is connected to said second segment of said i+1th supernode, and the first supernode is the i+1th supernode for i=m.

8. The system of claim 7 further comprising means for establishing communication links and passing messages between said first, second, third and fourth computers of each of said m supernodes, respectively, and further between each of said m supernodes so as to effect parallel-distributed processing.

9. The system of claim 6 wherein said third network interface card of said first computer of the ith supernode, wherein i=1 to m, is connected to said first segment of the i+1th supernode, said third network interface card of said second computer of said ith supernode is connected to said second segment of the i−1th supernode, and the first supernode is the i+1th supernode for i=m, and the mth supernode is the i−1th supernode for i=1.

10. The system of claim 6 further comprising means for establishing communication links and passing messages between said first, second, third and fourth computers of each of said m supernodes, respectively, and further between each of said m supernodes so as to effect parallel-distributed processing.

11. The system of claim 6 wherein said means for interconnecting comprise a second network interface card associated with each of said third and fourth computers of said m supernodes for use in connecting said m supernodes in a daisy-chain.

12. The system of claim 11 wherein said second network interface card of said third computer of the ith supernode, wherein i=1 to m, is connected to said first segment of the i+1th supernode, said second network interface card of said fourth computer of said ith supernode is connected to said second segment of said i+1th supernode, and the first supernode is the i+1th supernode for i=m.

13. The system of claim 12 further comprising means for establishing communication links and passing messages between said first, second, third and fourth computers of each of said m supernodes, respectively, and further between each of said m supernodes so as to effect parallel-distributed processing.

14. The system of claim 11 wherein said second network interface card of said third computer of the ith supernode, wherein i=1 to m, is connected to said first segment of the i+1th supernode, said second network interface card of said fourth computer of said ith supernode is connected to said second segment of the i−1th supernode, and the first supernode is the i+1th supernode for i=m, and the mth supernode is the i−1th supernode for i=1.

15. The system of claim 14 further comprising means for establishing communication links and passing messages between said first, second, third and fourth computers of each of said m supernodes, respectively, and further between each of said m supernodes so as to effect parallel-distributed processing.

16. The system of claim 6 wherein said means for interconnecting comprise a third and fourth network interface card associated with each of said first and second computers of each of said m supernodes for use in connecting said m supernodes in a torus architecture.

17. The system of claim 6 wherein said means for interconnecting comprise a third network interface card associated with each of said first and second computers of each of said m supernodes, and a second network interface card associated with each of said third and fourth computers of each of said m supernodes, for use in connecting said m supernodes in a torus architecture.

18. In a computer network architecture system comprising at least one supernode comprising first and second segments, first and second nodes each connected to said first and second segments, a third node connected to said first segment, and a fourth node connected to said second segment, a method for parallel-distributed processing comprising the steps of:

simultaneously processing data in each of said first, second, third and fourth nodes, respectively;

in a first phase, passing data on said first segment from said first node to said third node and then from said third node to said first node while simultaneously passing data on said second segment from said second node to said fourth node and then from said fourth node to said second node; and, in a second phase; passing data on said second segment from said first node to said fourth node and then from said fourth node to said first node while simultaneously passing data on said first segment from said second node to said third node and then from said third node to said second node.

19. The method of claim 18 further comprising the step of:

systematically passing data between pairs of nodes wherein each node of a respective pair of nodes is associated with a different supernode.

20. The method of claim 19 wherein the step of systematically passing data further comprises the steps of:

passing data between successive supernodes in parallel and on distinct segments in a shift phase; and, passing data between nodes within each supernode in parallel and on distinct segments in a merge phase.

21. The method of claim 20 further comprising the step of:

alternately repeating said shift phase and said merge phase until all data is passed between all nodes and all supernodes.

22. In a computer network architecture system comprising at least one supermode consisting essentially of: first and second segments, first and second nodes each connected to said first and second segments, a third node connected to said first segment, and a fourth node connected to said second segment, a method for parallel-distributed processing comprising the steps of:

processing data within each of said first, second, third and fourth nodes in parallel; and, systematically passing messages comprising intermediate results of calculations between pairs of nodes in such manner as to provide all messages to all nodes.

23. A system for parallel-distributed processing made up of plurality of supernodes, each consisting essentially of:

first and second segments;

first and second nodes each connected to said first and second segments, a third node connected to said first segment;

a fourth node connected to said second segment; and, means for establishing communication links and passing messages between each of said first, second, third and fourth nodes, said means providing for concurrent message passing between pairs of said nodes while avoiding contention on said first and second segments during message passing, and said means resulting in communication of processing results of each of said first, second, third and fourth nodes with the other three of said nodes, respectively.

24. The system of claim 23 wherein said means for establishing communication links and passing messages comprises interconnected hardware components and associated software.

25. A computer network architecture system made up of a plurality of computers arranged in supernodes, wherein each supernode consists essentially of:

a first segment;

a second segment;

a first computer having two network interface cards associated therewith, said first computer being connected to said first segment through a first of said two network interface cards, and said first computer being connected to said second segment through a second of said two network interface cards;

a second computer having two network interface cards associated therewith, said second computer being connected to said first segment through a first of said two network interface cards, and said second computer being connected to said second segment through a second of said network interface cards;

a third computer having one network interface card associated therewith, said third computer only being connected to said first segment through a first of said network interface cards; and, a fourth computer having one network interface card associated therewith, said fourth computer only being connected to said second segment through a first of said one network interface cards.

* * * * *